United States Patent [19]

Muha et al.

[11] Patent Number: 5,591,780
[45] Date of Patent: Jan. 7, 1997

[54] LOW ODOR AMINE CATALYSTS FOR POLYURETHANE FLEXIBLE SLABSTOCK FOAMS BASED ON POLYESTER POLYOLS

[75] Inventors: Krunoslav Muha, Henstedt-Ulzburg, Germany; Steven P. Hulme, Macclesfield, England; Mark E. Harakal, Hurricane, W. Va.

[73] Assignee: Air Products and Chemicals, Inc., Allentown, Pa.

[21] Appl. No.: 633,325

[22] Filed: Apr. 17, 1996

Related U.S. Application Data

[63] Continuation of Ser. No. 215,067, Mar. 18, 1994.

[51] Int. Cl.[6] ................................................. C08G 18/20
[52] U.S. Cl. ............................ 521/128; 521/129; 521/172
[58] Field of Search ............................ 521/128, 129, 521/172

[56] References Cited

U.S. PATENT DOCUMENTS

| | | | |
|---|---|---|---|
| 3,448,065 | 6/1969 | Green | 260/2.5 |
| 4,067,831 | 1/1978 | Wasilczyk | 521/128 |
| 4,218,543 | 8/1980 | Weber et al. | 521/128 |
| 4,234,693 | 11/1980 | Wooler | 521/107 |
| 4,237,240 | 12/1980 | Jarre et al. | 521/59 |
| 4,258,141 | 3/1981 | Jarre et al. | 521/128 |
| 4,431,753 | 2/1984 | Casati et al. | 521/121 |
| 4,544,679 | 10/1985 | Tideswell et al. | 521/128 |
| 4,588,755 | 5/1986 | Kollmeier et al. | 521/112 |
| 5,100,927 | 3/1992 | Tomano et al. | 521/128 |
| 5,104,907 | 4/1992 | Yoshimura et al. | 521/128 |
| 5,306,738 | 4/1994 | Yoshimura et al. | 521/128 |

FOREIGN PATENT DOCUMENTS

| | | |
|---|---|---|
| 671012 | 10/1964 | Belgium . |
| 0451826 | 10/1991 | European Pat. Off. . |
| 0566247 | 10/1993 | European Pat. Off. . |

*Primary Examiner*—Morton Foelak
*Attorney, Agent, or Firm*—Michael Leach; William F. Marsh

[57] ABSTRACT

A method for preparing a polyester flexible slabstock polyurethane foam which comprises reacting an organic polyisocyanate and a polyester polyol in the presence of a blowing agent, optionally a cell stabilizer and a catalyst composition consisting essentially of N-methylimidazole or 1,2-dimethylimidazole, or both.

12 Claims, No Drawings

LOW ODOR AMINE CATALYSTS FOR POLYURETHANE FLEXIBLE SLABSTOCK FOAMS BASED ON POLYESTER POLYOLS

This application is a continuation of application Ser. No. 08/215,067 filed on Mar. 18, 1994.

TECHNICAL FIELD

The present invention relates to the use of imidazoles as catalysts for producing polyurethanes.

BACKGROUND OF THE INVENTION

The polyurethane industry is coming under increased pressure from many environmental groups due to emissions of chemicals during the production of foam, worker exposure to these chemicals, and ultimately the recyclability of the final polyurethane materials. During the foaming process, polyols are reacted with polyisocyanates in the presence of blowing agents, i.e., water and secondary materials such as chlorofluorocarbons (CFCs), methylene chloride, and the like. An integral part of the production of these foams is the inclusion of silicone surfactants to stabilize the developing foam cells and catalysts to both initiate the foam reaction (blowing reaction) and effect cure of the developing foam matrix (gelling reaction). Typical catalysts used to initiate the blow and gel reactions in polyether polyol flexible foam formulations are bisdimethylaminoethylether and triethylenediamine (TEDA). Both these molecules possess tertiary amine functionality.

As compared to flexible polyether polyol formulations, foams formulated from polyester polyols have significantly higher reactivity that require the use of different types of catalysts. A polyester polyol differs from a polyether polyol in terms of its functionality, molecular weight and the nature of the hydroxyl groups. Polyester polyols contain highly reactive primary alcohols, while polyether polyols usually contain less reactive secondary alcohols.

Of greater significance to the selection of a catalyst in these systems is the use of different ratios of toluenediisocyanate (TDI) isomers. The difference in reactivity toward the blowing reaction (isocyanate and water reaction to form $CO_2$) is a result of the 2,4-TDI isomer being more reactive to the water molecular than the 2,6-TDI isomer due to steric hindrance in the latter. The difference in reactivity toward the gelation reaction (isocyanate and polyol reacting to form polyurethane linkages) between the isomers is even greater due to the size of the polyol chains restricting mobility of the OH functional group. Thus the quantitative effect of steric hindrance of the 2,6-TDI isomer is increased. As gelation is reduced significantly with the 2,6-TDI isomer compared to the 2,4-TDI isomer, additional urea formation is feasible via the continued blowing reaction resulting in enhanced cell openness. The combination of reduced activity, substantially reduced gelation and increased cell opening from urea formation leads to the need for a relatively strong gelation catalyst when higher amounts of 2,6-TDI isomer are used.

Only a few catalyst molecules allow for foam formation with desired smooth reaction profiles and without final foam shrinkage. By smooth reaction profile, we mean a low maximum rise rate of the developing foam which leads to smooth processability resulting in minimized density and air flow gradients, reduced voids and split-free as well as pinhole-free foam. The catalyst must work synergistically with the silicone surfactant providing for good processing latitude that results in smooth rise profiles, minimal recession, consistent density distribution and sufficient cell openness. A catalyst for polyester slabstock foam must have strong blowing capabilities in TDI 80/20 (2,4TDI/2,6-TDI) formulations. The catalyst should have well balanced blow/gelation characteristics for formulations based on mixtures of TDI 80/20 and TDI 65/35, while stronger gelation characteristics are required for formulations based on TDI 65/35. In formulations based upon TDI 80/20, the blowing catalysts utilized are typically based upon morpholine structures, such as N-ethylmorpholine (NEM) or N-methylmorpholine NMM), and 1,2-dimethylpiperazine (DMP) with N-cetylamine used as a co-catalyst to effect gelation. In mixed isocyanate (TDI 80/20 and TDI 65/35) or TDI 65/35 isocyanate systems, the catalyst must have more balanced blow to gelation properties; for these formulations, benzyldimethylamine (BDMA) is typically used as a catalyst. Both the NEM and BDMA type catalysts provide for broad processing latitude with optimal foam characteristics. Physical properties of the foam must include a scorch-free appearance (no yellowing) with fine cell structures free of pinholes which is required for flame lamination to textile.

The problem confronting the industry is that although these catalysts provided for optimum reaction profiles in the polyester polyol slabstock systems, they also possess negative attributes in terms of their odor, corrosivity and handling, and toxicological properties. These negative attributes may be significant issues in a foaming operation.

During a foaming process the liquid chemicals are laid down through a variety of techniques onto a moving conveyor contained within a channel. As the foam ingredients react, the exotherm results in the vaporization of blowing agents and the foam rises within the moving channel. During the initial phase of foam rise there is a blowoff of chemicals from the foam, most notably TDI in the vapor state, $CO_2$ from the reacting water and also low volatility additives. To reduce worker exposure to these potentially harmful vapors, the first stage of the continuous foaming process is done in an enclosed ventilated area; however, due to the speed with which many manufacturers run production to maximize output, the developing foam is enclosed within this area for only several minutes. Directly after the stage,. the foam is cut and moved along conveyors to a storage area. During this latter phase of production, plant workers are continuously exposed to any vapors emitted from the cut foam. Since maximum temperatures are not reached in the foam until about 10 hours after production, higher molecular weight additives such as the catalysts will start to migrate out of the foam into the surrounding environment. In the case of catalysts such as NEM, NMM and BDMA, vapor pressures are sufficient to volatilize amine during this cutting and storage process.

There are several facets to this problem, the first of which is that these materials possess extremely strong odors not unlike that of ammonia. As the catalysts are potential lacrimators, a worker in close proximity to the foam would suffer from extreme tearing. Additional problems with the use of these materials is that the co-catalyst necessary to obtain the desired curing profiles in the foam are strong irritants, so that workers involved in any handling of either the pure catalyst or final foam may develop skin irritation as a result of this exposure. The residual odor of products such as NEM, NMM, and BDMA can extend beyond the curing stage into the final cutting and fabrication points of the facility, thereby exposing additional workers to the odor and harmful side effects of the catalyst. A polyester flexible slabstock foam production facility is notable by the continuous emanation of amine odors at all times, both inside and around the plant.

Accordingly, there has been extreme pressures on the suppliers of catalysts to the polyester polyol flexible slabstock industry to produce new, lower odor versions of the catalysts. Prior attempts to develop new catalysts have included derivatives of morpholine as exemplified by N-methoxyethylmorpholine, N-methoxypropylmorpholine and 2,2-dimorpholinodiethylether. However, in order to achieve the same reactivity as the conventional polyester catalysts (NEM, NMM and BDMA), it is necessary to co-catalyze these systems with other amines such as dimethylpiperazine. Piperazine molecules have a reasonably strong odor and are known irritants that can cause adverse toxicological and health effects such as blue haze.

Other attempts at replacing conventional polyester catalysts have resulted in compromises, either in terms of system reactivity or some degree of odor or toxicological effects. Conventional gelation catalysts such as dimethylcyclohexylamine have been used either partially or completely as a replacement for NEM. This molecule is very attractive and provides for excellent gelation in polyesters systems; if anything, the use levels of this product must be carefully metered to maintain desired system reactivity. However, the odor from this catalyst rivals that of NEM.

To date there have been no realistic solutions presented to the market that address the issues of balanced reactivity and reduced worker exposure during the production of polyester polyol-based polyurethane foam. Thus there is a need in the industry for low odor catalysts that manifest a smooth reaction profile comparable to the current industry standard catalysts NEM and BDMA, i.e., drop-in replacements for NEM and BDMA.

In addition, processability of the reaction streams of the polyurethane system is critical. Due to the high viscosity of the polyol-containing component (premix) of the polyurethane system, catalysts must be liquid at about 15° C. or soluble in a suitable carrier so that it may be delivered into the polyol-containing component for the reaction process in liquid phase.

U.S. Pat. No. 3,152,094 discloses the use of certain imidazoles in the production of polyurethane foams. Example III shows the use of 2-methylimidazole in a polyester polyol flexible polyurethane foam formulation.

U.S. Pat. No. 3,448,065 discloses methods for producing polyurethane foams using N-hydroxyalkyl substituted imidazoles.

U.S. Pat. No. 4,234,693 discloses a process for making polyurea foams which comprises reacting an organic polyisocyanate with at least a chemically equivalent amount of water in the presence of an imidazole compound, such as 1-alkyl and 1,2-dialkyl imidazoles as sole catalysts. Polymeric polyols are suggested as being useful in reducing the friability of the foams.

BE 671,012 discloses preparing polyurethane foams using 1,2-di substituted imidazoles as catalysts to prepare flexible and rigid polyurethane foams. Examples show the effectiveness of the catalyst in polyether flexible and rigid foam systems, but do not show any polyester polyol systems.

U.S. Pat. No. 5,104,907 discloses the use of certain substituted imidazoles for producing a high resilience polyurethane foam in which the polyisocyanate contains diphenylmethane diisocyanate and the blowing agent is water and/or a halogenated hydrocarbon.

EP 0 451 862 disclosed a process for producing flexible polyurethane foam by the reaction of a polyol with a polyisocyanate in the presence of an amine catalyst, a blowing agent, and a foam stabilizer, the amine catalyst comprising at least one of the imidazoles represented by a certain generic formula.

SUMMARY OF THE INVENTION

The present invention provides a catalyst composition for the production of foamed polyurethanes from polyester polyols. The catalyst compositions comprise N-methylimidazole (1-methylimidazole) or 1,2-dimethylimidazole, MI and DMI, respectively.

As an advantage of these catalysts there is significantly reduced odor during the foaming process as well as from the finished foam product. Significantly, these catalysts provide smooth rise profiles leading to predominantly open-celled foam and are easily delivered as solutions in carriers which are common to polyurethane processes.

Thus, there is provided low odor catalysts that manifest a smooth reaction profile comparable to the current industry standard catalysts NEM and BDMA, i.e., drop-in replacements for NEM and BDMA.

Also provided is a method for preparing a polyester flexible slabstock polyurethane foam which comprises reacting an organic polyisocyanate and a polyester polyol in the presence of a blowing agent, optionally a cell stabilizer, and a catalyst composition consisting essentially of N-methylimidazole or 1,2-dimethylimidazole, or both.

DETAILED DESCRIPTION OF THE INVENTION

The catalyst compositions according to the invention can catalyze (1) the reaction between an isocyanate functionality and an active hydrogen-containing compound, i.e. an alcohol, a polyol, an amine or water, especially the urethane (gelling) reaction of polyol hydroxyls with isocyanate to make polyurethanes and the blowing reaction of water with isocyanate to release carbon dioxide for making foamed polyurethanes, and/or (2) the trimerization of the isocyanate functionality to form polyisocyanurates.

The polyurethane products are prepared using any suitable organic polyisocyanates well known in the art including, for example, hexamethylene diisocyanate, phenylene diisocyanate, toluene diisocyanate ("TDI") and 4,4'-diphenylmethane diisocyanate ("MDI"). Especially suitable are the 2,4- and 2,6-TDI's individually or together as their commercially available mixtures. Other suitable isocyanates are mixtures of diisocyanates known commercially as "crude MDI", also known as PAPI, which contain about 60% of 4,4'-diphenylmethane diisocyanate along with other isomeric and analogous higher polyisocyanates. Also suitable are "prepolymers" of these polyisocyanates comprising a partially prereacted mixture of a polyisocyanate and a polyether or polyester polyol.

Suitable polyester polyols as a component of the polyurethane composition for flexible slabstock foams are well known in the industry. Illustrative of such suitable polyester polyols for flexible slabstock foams are those produced by reacting a dicarboxylic and/or monocarboxylic acid with an excess of a diol and/or polyhydroxy alcohol, for example, adipic acid, glutaric acid, succinic acid, phthalic acid or anhydride, and/or fatty acids (linolic acid, oleic acid and the like) with diethylene glycol, ethylene glycol, propylene glycol, dipropylene glycol, 1,4-butanediol, trimethylolpropane and/or pentaerythritol.

Other typical agents found in the polyurethane foam formulations include chain extenders such as ethylene glycol and butanediol; crosslinkers such as diethanolamine, diisopropanolamine, triethanolamine and tripropanolamine; blowing agents such as water, methylene chloride, trichlorofluoromethane, and the like; and optionally cell stabilizers such as silicones. Many other additives such as flame retardants, dyes, pigments and oils can also be included.

A general polyester polyol polyurethane flexible slabstock foam formulation having a 8–80 kg/m³ density and containing the catalyst composition according to the invention would comprise the following components in parts by weight (pbw):

| Flexible Foam Formulation | pbw |
| --- | --- |
| Polyester Polyol | 100 |
| Silicone Surfactant | 0–2.5 |
| Blowing Agent | 1–9 |
| Organotin Catalyst | 0–0.2 |
| Imidazole Catalyst | 0.2–2 |
| Isocyanate Index 70–115 | |

The catalyst composition consists essentially of imidazoles of the following formula:

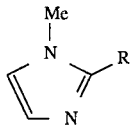

where R is hydrogen or methyl. The imidazoles may be used as the sole catalysts, in combination with one another or in combination with other tertiary amine, organotin or carboxylate urethane catalysts well known in the urethane art.

The imidazoles which are commercially available from BASF AG Ludwigshafen, Germany are conveniently delivered as pure compounds. The catalysts are conveniently delivered to the polyol-containing premix as solutions, preferably in carriers such as alcohols and polyols. The most preferred carrier is dipropylene glycol (DPG). The polyurethane industry requires that reactants be delivered into the reaction process in liquid phase. Most foam producers, if not all, will not use solid materials unless they are soluble ($\geq$150 mg/ml) in solvent appropriate for the urethane system.

A catalytically effective amount of the catalyst composition is used in the polyurethane formulation. More specifically, suitable amounts of the catalyst composition (solids) may range from about 0.01 to 10 parts, preferably 0.1 to 3 parts, per 100 parts polyester polyol (phpp) in the polyurethane formulation.

These catalyst compositions afford the advantage of significantly reduced odor during the foaming process as well as from the finished product. Amine emissions from the plant can also be greatly reduced allowing for a safer working environment. Additionally, these catalysts provide smooth rise profiles leading to predominantly open-celled foam and are easily delivered as solutions in carriers which are common to polyurethane foam processes.

EXAMPLE 1

In this example, the various imidazoles were delivered at room temperature into the polyester polyol flexible slabstock foam reaction mixture of Table 1. Any imidazole which was non-liquid at room temperature was introduced in a suitable carrier, such as DPG. MI and DMI were used as 50% solutions in DPG. Some imidazoles were not soluble in such diluents and thus were deemed undesirable and not evaluated. Reaction profiles were obtained using ultrasonic rate of rise equipment. The use level of each catalyst shown in Table 2 was such as to achieve a rise time of about 85 seconds in each instance, since that is the time required by a typical conveyor line speed.

TABLE 1

| | Pbw |
| --- | --- |
| Desmophen 2200 polyester polyol[a] | 100 |
| DABCO ® DC 5526 silicone surfactant | 1.5 |
| Water | 4 |
| Catalyst | see Table 2 |
| Desmodur T-80 Isocyanate[b] | Index 95 |

[a]Polyester polyol from Bayer AG.
[b]TDI 80/20 from Bayer AG.

TABLE 2

| Catalyst | Use Level (pphp) | Rise Time (sec) | Max. Rise Speed (mm/sec) | Airflow (m³/min) |
| --- | --- | --- | --- | --- |
| BDMA | 1.0 | 85 | 5.85 | 0.048 |
| NEM | 1.5 | 85 | 5.70 | 0.051 |
| MI | 0.55 | 85 | 5.60 | 0.057 |
| DMI | 0.35 | 84 | 5.50 | 0.050 |
| IBMI | 0.40 | 84 | 6.10 | 0.045 |
| BMI | 0.75 | 86 | 6.20 | 0.043 |
| CEMI | 1.00 | 86 | 6.20 | 0.043 |

BDMA — benzyldimethylamine
NEM — N-ethylmorpholine
MI — N-methylimidazole
DMI — 1,2-dimethylimidazole
IBMI — 1-isobutyl-2-methylimidazole
BMI — 1-benzyl-2-methylimidazole
CEMI — 1-cyanoethlyl-2-ethyl-4-methylimidazole The data in Table 2 shows clearly improved reactivity (smooth rise profiles) for 1,2-DMI and MI compared to other imidazoles having similar structures.

For a given rise time a lower maximum rise speed is desirable. Too steep a profile will lead to difficult processing and may lead to foam collapse. Other imidazoles such as 2-methylimidazole, 2-undecylimidazole and 2-heptadecylimidazole were not successfully introduced to the reaction mixture due to insolubility. Besides the favored reaction profiles obtained using both MI and DMI, greater airflows were obtained compared to other imidazoles, another very favorable outcome.

EXAMPLE 2

This example shows the use of DMI as a suitable polyester slabstock catalyst allowing for reduced amine emissions. Emissions from various ventilation points around an industrial plant for making slabstock foam were measured while producing polyester polyol foam with BDMA. A similar production run was performed using DMI as the catalyst. While the emissions for BDMA ranged from 0.8 to 10.0 mg/Nm³, no DMI was detected.

STATEMENT OF INDUSTRIAL APPLICATION

The present invention provides imidazole urethane catalysts for use in making polyester polyol-based flexible slabstock polyurethane foams.

We claim:

1. In a method for preparing a flexible polyurethane slabstock foam which comprises reacting an organic polyisocyanate and a polyester polyol in the presence of a blowing agent, optionally a cell stabilizer, and a catalyst composition, the improvement for providing a flexible open-celled polyurethane slabstock foam which comprises employing a catalyst composition consisting essentially of N-methylimidazole or 1,2-dimethylimidazole, or both.

2. The method of claim 1 in which the catalyst composition consists essentially of N-methylimidazole.

3. The method of claim 1 in which the catalyst composition consists essentially of 1,2-dimethylimidazole.

4. The method of claim 1 in which the catalyst composition is used in combination with a tertiary amine, organotin or carboxylate urethane catalyst.

5. The method of claim 2 in which the catalyst composition is used in combination with a tertiary amine, organotin or carboxylate urethane catalyst.

6. The method of claim 3 in which the catalyst composition is used in combination with a tertiary amine, organotin or carboxylate urethane catalyst.

7. In a method for preparing a flexible polyurethane slabstock foam which comprises reacting toluenediisocyanate and a polyester polyol in the presence of water as a blowing agent, optionally a cell stabilizer, and a catalyst composition, the improvement for providing a flexible open-celled polyurethane slabstock foam which comprises employing a catalyst composition consisting essentially of N-methylimidazole or 1,2-dimethylimidazole, or both.

8. The method of claim 7 in which the catalyst composition consists essentially of N-methylimidazole.

9. The method of claim 7 in which the catalyst composition consists essentially of 1,2-dimethylimidazole.

10. The method of claim 7 in which the catalyst composition is used in combination with a tertiary amine, organotin or carboxylate urethane catalyst.

11. The method of claim 8 in which the catalyst composition is used in combination with a tertiary amine, organotin or carboxylate urethane catalyst.

12. The method of claim 9 in which the catalyst composition is used in combination with a tertiary amine, organotin or carboxylate urethane catalyst.

* * * * *